United States Patent
Katou (10) Patent No.: US 10,926,447 B2
(45) Date of Patent: Feb. 23, 2021

(54) DECORATIVE MULTILAYERED EXTRUSION-BLOW-FORMED BOTTLE

(71) Applicant: TOYO SEIKAN CO., LTD., Tokyo (JP)

(72) Inventor: Yuuichirou Katou, Yokohama (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 120 days.

(21) Appl. No.: 16/316,369

(22) PCT Filed: Jul. 13, 2017

(86) PCT No.: PCT/JP2017/025561
§ 371 (c)(1),
(2) Date: Jan. 9, 2019

(87) PCT Pub. No.: WO2018/037750
PCT Pub. Date: Mar. 1, 2018

(65) Prior Publication Data
US 2019/0291327 A1    Sep. 26, 2019

(30) Foreign Application Priority Data
Aug. 25, 2016  (JP) .............................. JP2016-164629

(51) Int. Cl.
*B32B 27/00*   (2006.01)
*B29C 49/04*   (2006.01)
(Continued)

(52) U.S. Cl.
CPC .............. *B29C 49/04* (2013.01); *B29C 49/22* (2013.01); *B32B 27/00* (2013.01); *B32B 27/20* (2013.01);
(Continued)

(58) Field of Classification Search
CPC ... B29C 49/04; B29C 49/22; B29C 2949/781; B32B 27/20; B32B 27/285; B32B 27/00;
(Continued)

(56) References Cited

U.S. PATENT DOCUMENTS

| 8,513,344 B2 | 8/2013 | Asano et al. |
| 2002/0150781 A1 | 10/2002 | Wanic et al. |
| 2017/0217141 A1 | 8/2017 | Katou et al. |

FOREIGN PATENT DOCUMENTS

| EP | 2 641 837 A1 | 9/2013 |
| JP | 4-53725 A | 2/1992 |

(Continued)

OTHER PUBLICATIONS

Communication dated Mar. 16, 2020, from the European Patent Office in corresponding application No. 17843237.3.
(Continued)

*Primary Examiner* — Michael C Miggins
(74) *Attorney, Agent, or Firm* — Sughrue Mion, PLLC

(57) ABSTRACT

A decorative multilayered extrusion-blow-formed bottle having an inner layer of a polyethylene (A) and a metallic layer of a polyethylene (B) in which a metal pigment having an average thickness of not more than 600 nm is dispersed on the outer side of the inner layer. If the shear viscosities (Pa·s) of the resin forming the layer neighboring the metallic layer on the inner side thereof are denoted by $V_6$ and $V_{30}$ as measured at the shear rates 6 s$^{-1}$ and 30 s$^{-1}$ thereof at a temperature of 210° C., then the shear viscosities (Pa·s) $\eta_6$ and $\eta_{30}$ of the polyethylene (B) measured at the shear rates 6 s$^{-1}$ and 30 s$^{-1}$ thereof at a temperature of 210° C. satisfy the following viscosity condition formulas (1) and (2):

$$\eta_6 \geq V_6 - 2000 \tag{1}$$

$$\eta_{30} \geq V_{30} - 2000 \tag{2}$$

5 Claims, 2 Drawing Sheets (51) Int. Cl.
  *B29C 49/22* (2006.01)
  *B32B 27/20* (2006.01)
  *B32B 27/28* (2006.01)
  *B32B 27/32* (2006.01)
  *B65D 1/00* (2006.01)

(52) U.S. Cl.
  CPC ............ *B32B 27/285* (2013.01); *B32B 27/32* (2013.01); *B65D 1/00* (2013.01); *B29C 2949/781* (2013.01); *B32B 2439/60* (2013.01); *B32B 2451/00* (2013.01)

(58) Field of Classification Search
  CPC . B32B 27/32; B32B 2439/60; B32B 2451/00; B65D 1/00
  See application file for complete search history.

(56) References Cited

FOREIGN PATENT DOCUMENTS

| | | |
|---|---|---|
| JP | 7-89526 A | 4/1995 |
| JP | 2010-121092 A | 6/2010 |
| WO | 2015/069826 A1 | 5/2015 |
| WO | 2016/031846 A1 | 3/2016 |

OTHER PUBLICATIONS

International Search Report for PCT/JP2017/025561 dated Aug. 8, 2017.

DECORATIVE MULTILAYERED EXTRUSION-BLOW-FORMED BOTTLE

CROSS REFERENCE TO RELATED APPLICATIONS

This application is a National Stage of International Application No. PCT/JP2017/025561 filed Jul. 13, 2017, claiming priority based on Japanese Patent Application No. 2016-164629 filed Aug. 25, 2016.

TECHNICAL FIELD

This invention relates to a decorative multilayered extruded and directly blow-formed bottle having a metallic layer that contains a metal pigment.

BACKGROUND ART

Directly blow-formed bottles, in general, have body walls that are rich in flexibility, and enable the contents to be easily discharged upon being squeezed. Therefore, they have been widely used as plastic containers for containing a variety of kinds of contents such as foods through up to cosmetics, hair-care products (shampoo, rinse, etc.) and the like products.

Here, to enhance commercial values of the plastic containers, means has been employed to impart an appearance of a metallic tone (metallic lustrous tone) to them. However, imparting the metallic tone has been limited to such expensive products as containers for cosmetics and the like.

That is, the appearance of metallic tone is imparted to the plastic containers by such a method as spraying a metal pigment to form a coating of the metal pigment on the outer surfaces of the containers or a method of forming a shrink film by gravure printing a metal pigment, and covering the outer surfaces of the containers with the shrink film. According to the above methods, however, the coating must be applied for each container or the shrink film must be applied for each container causing a remarkable increase in the cost. Therefore, the above methods could not be practically applied to inexpensive containers for containing, for example, hair-care products.

Besides, with the above-mentioned shrink film system, the containers are limited to those having straight body walls or to those of the shapes close thereto.

In order to inexpensively impart metallic appearance, for example, a patent document 1 is proposing a master batch system in which a master batch is formed by imbibing a flake-like metal pigment in, for example, a resin, and directly blow-forming the resin blended with the master batch into a bottle so as to be provided with a decorative layer in which the metal pigment has been dispersed. The master batch system is capable of imparting the metallic tone less expensively than the above-mentioned spray-coating method or the shrink film method. In this case, however, the metallic appearance (metallic luster) is not sufficient, and it has been desired to further improve the metallic appearance.

Further, a patent document 2 is proposing a multilayered directly blow-formed bottle that has a metallic layer formed at a position where it is legible from the side of the outer surface, the metallic layer being the one formed by dispersing a metal pigment of an average thickness of not more than 1 μm in a resin. The multilayered directly blow-formed bottle uses the metal pigment of an average thickness of as very small as not more than 1 μm as the pigment for imparting the metallic appearance. However, though it is said that an improved metallic appearance can be thus expressed, it has still been desired to realize a further improved metallic appearance.

Moreover, the present applicant has previously proposed a decorative resin composition obtained by dispersing a metal pigment having an average thickness of not more than 600 nm in a blend of a low-density polyethylene (LDPE) having a density of not less than 0.910 g/cm$^3$ but less than 0.930 g/cm$^3$ and a linear low-density polyethylene (LLDPE) having a density of 0.910 to 0.925 g/cm$^3$ (WO2017/038623).

When the resin composition is extrusion-formed, the metal pigment therein is favorably oriented in the direction of extrusion. Therefore, the metal pigment effectively exhibits its metallic luster.

PRIOR ART DOCUMENTS

Patent Documents

Patent document 1: JP-A-2010-121092
Patent document 2: WO2016/031846

OUTLINE OF THE INVENTION

Problems that the Invention is to Solve

It is, therefore, an object of the present invention to provide a decorative multilayered extrusion-blow-formed bottle that is decorated in a metallic tone by a very inexpensive means and that exhibits very excellent metallic appearance.

Means for Solving the Problems

The present inventors have conducted experiments and study extensively in an effort to imparting metallic appearance to the decorative multilayered extrusion-blow-formed bottles that have a metallic layer formed by blending a polyethylene with a metal pigment. As a result, the inventors have discovered the fact that the metallic appearance is greatly affected by the shear viscosity of a resin that is forming a layer (inner neighboring layer) that is neighboring the metallic layer on the inner side thereof, and have completed the present invention.

According to the present invention, there is provided a decorative multilayered extrusion-blow-formed bottle having an inner layer of a polyethylene (A) and a metallic layer of a polyethylene (B) in which a metal pigment having an average thickness of not more than 600 nm is dispersed on an outer side of the inner layer, wherein, if a shear viscosities (Pa·s) of a resin that is forming a layer neighboring the metallic layer on an inner side thereof are denoted by $V_6$ and $V_{30}$ as measured at a shear rates 6 s$^{-1}$ and 30 s$^{-1}$ thereof at a temperature of 210° C., then a shear viscosities (Pa·s) $\eta_6$ and $\eta_{30}$ of the polyethylene (B) measured at the shear rates 6 s$^{-1}$ and 30 s$^{-1}$ thereof at a temperature of 210 satisfy the following viscosity condition formulas (1) and (2):

$$\eta_6 \geq V_6 - 2000 \tag{1}$$

$$\eta_{30} \geq V_{30} - 2000 \tag{2}$$

In the decorative multilayered extrusion-blow-formed bottle of the present invention, it is desired that:
(A) if a shear viscosity (Pa·s) of a resin that is forming a layer neighboring the metallic layer on an inner side thereof is denoted by $V_{10}$ as measured at a shear rate 10 s$^{-1}$ thereof at a temperature of 210° C., then a shear viscosity (Pa·s) $\eta_{10}$ of the polyethylene (B) measured at the shear rate 10 s$^{-1}$ thereof at the temperature of 210° C., further, satisfies the following viscosity condition formula (3):

$$\eta_{10} \geq V_{10} - 2000 \qquad (3)$$

(B) The layer neighboring the metallic layer on the inner side thereof is the inner layer;
(C) The resin that is forming the layer neighboring the metallic layer on the inner side thereof is the polyethylene (A);
(D) The layer neighboring the metallic layer on the inner side thereof is the reground resin layer containing scraps that generate during the forming; and
(E) The metal pigment is an aluminum pigment.

Effects of the Invention

The decorative multilayered extrusion-blow-formed bottle of the present invention has a basic structure of layers in that it includes an inner layer of a polyethylene (A) (layer forming the inner surface) and a metallic layer of a resin in which a metal pigment having an average thickness of not more than 600 nm is dispersed on the outer side of the inner layer. Here, what is particularly important is that, as the resin that forms the metallic layer, use is made of the polyethylene (B) that satisfies the shear viscosity conditions specified by the above formulas (1) and (2) for the resin that forms the layer that neighbors the metallic layer on the inner side thereof.

That is, when the polyethylene (B) is used as a base resin (matrix) for forming the metallic layer, the metal pigment having an average thickness that is as small as described above is effectively prevented from being deformed and expresses excellent metallic appearance. For instance, as will be demonstrated in Examples appearing later, when the light is incident on the outer surface of the bottle wall at an angle of 45 degrees, a lightness L*$_{15}$ (L*a*b* coloring system) in a direction of 15 degrees relative to the regularly reflected light is not less than 150, which is an excellent metallic luster.

Therefore, the decorative multilayered extrusion-blow-formed bottle of the present invention exhibits a highly decorative appearance (metallic appearance) due to the metallic layer. Besides, the decorative multilayered extrusion-blow-formed bottle expresses metallic appearance without the need of executing the after treatment such as spray coating or treatment with a shrink film. Therefore, the decorative multilayered extrusion-blow-formed bottle can be obtained at a very reduced cost offering a great advantage. Accordingly, the decorative multilayered extrusion-blow-formed bottle of the invention is not limited to the use of expensive cosmetic products only but can also be effectively used for packing haircare products such as shampoo, rinse, etc., as well as for packing low-cost products such as liquid detergents.

MODES FOR CARRYING OUT THE INVENTION

<Principle of the Invention>

In the decorative multilayered extrusion-blow-formed bottle of the present invention, the metallic layer is provided on the outer side of the inner layer, the metallic layer containing a metal pigment of a small thickness (average thickness of not more than 600 nm) that are dispersed therein. Here, in order for the metallic layer to express excellent metallic appearance, it is essential that the thin metal pigment is oriented in the metallic layer in the direction of surface of the bottle. If the pigment is dispersed in random directions, then the light is much reflected irregularly by the metallic layer spoiling, therefore, the metallic appearance. Namely, the ratio of the light that is regularly reflected becomes smaller than the light that is incident on the surface of the bottle from a direction of 45 degrees, accounting for a decrease in the metallic appearance.

The present inventors, further, consider that when an excellent metallic appearance is to be expressed by using the metal pigment that has a thickness which is so small as described above, a greater importance is placed on maintaining the shape of the pigment in addition to maintaining its orientation.

That is, the bottle is obtained by, first, forming a cylindrical parison by melt-extruding the resins (or the resin compositions) to form the layers, and blowing a fluid therein in a state where an end of the parison is pinched off and is closed. Therefore, the metal pigment is oriented to some extent in the direction of the surface of the bottle due to the melt extrusion. Here, however, the metal pigment assumes the shape of a very thin flake. When being melt-extruded for forming the parison, therefore, the pigment is partly deformed being affected by the flow of the resin layer that neighbors the metallic layer on the inner side thereof. Accordingly, more light is reflected irregularly to impair the metallic appearance.

Figure 1:
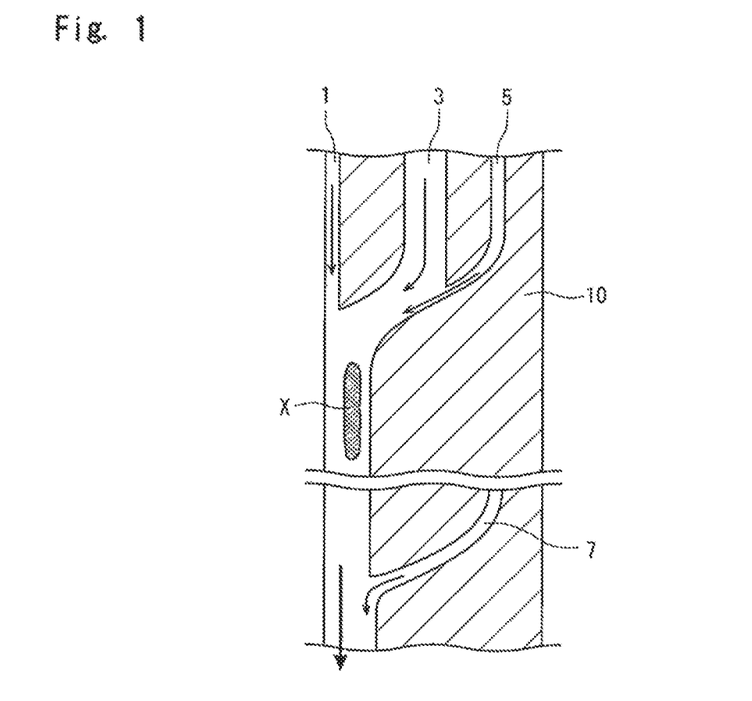
FIG. 1 is a view illustrating the flow of resins in a die head at the time of extrusion forming.

Reference is now made, for example, to FIG. 1 which illustrates the state of the resin flows in the die head at the time of extrusion forming. The extrusion forming is executed by using a multilayer die 10; i.e., the resins are melt-extruded through the annular spaces in the die depending on the layer structure of the desired bottle. In this case, there is formed a bottle of such a layer structure that an inner layer (polyethylene (A) layer), a reground resin layer and a metallic layer are formed successively from the inner surface toward the outer surface. As seen from the inner side toward the outer side, therefore, there are flowing down in a molten state an inner layer resin stream 1, a reground resin layer stream 3 and a metallic layer resin stream 5.

Here, the reground resin layer is a resin layer comprising a mixture of a polyethylene and scraps such as burr produced at the time of forming the bottles.

As will be understood from FIG. 1, the inner layer resin stream 1 flows maintaining a straight cylindrical shape, but the reground resin layer stream 3 that flows through the neighboring annular space is forced to decrease its diameter as it goes downward and meets the inner layer resin stream 1. The metallic layer resin stream 5 that flows through the annular space neighboring the reground resin layer stream 3, is further forced to decrease its diameter and meets the inner layer resin stream 1 and the reground layer resin stream 3. The resulting resin stream of the resin streams 1, 3 and 5 then continues to flow down in layers maintaining the straight cylindrical shape.

After the resin streams have met together, another resin stream 7 meets thereto at a lower portion, the resin stream 7 being dedicated to forming a resin layer on the outer side of the metallic layer. Finally, therefore, there are formed the layers corresponding to the layer structure of the bottle.

As the resins for forming the layers are melt-extruded as described above, the molten resins flow most quickly at a portion where the resin streams 1, 3 and 5 meet together and in a vicinity region thereof (designated at X in FIG. 1, hereinafter called meeting region X).

That is, the thin metal pigment contained in the metallic layer resin stream 5 receives the greatest shearing force at the meeting region X after the streams have met together. Therefore, the metal pigment is partly deformed and impairs the metallic appearance. Moreover, the interface is disturbed between the metallic layer and the layer neighboring thereto on the inner side causing unevenness in the thickness of the metallic layer and developing shark skin that would be often observed.

In the present invention, on the other hand, if the shear viscosities (Pa·s) of the resin (reground resin layer in FIG. 1) that is forming the layer neighboring the metallic layer on the inner side thereof are denoted by $V_6$ and $V_{30}$ as measured at the shear rates 6 s$^{-1}$ and 30 s$^{-1}$ thereof at a temperature of 210° C. and if the shear viscosities (Pa·s) of the resin for forming the metallic layer are denoted by $\eta_6$ and $\eta_{30}$ as measured at the shear rates 6 s$^{-1}$ and 30 s$^{-1}$ thereof at a temperature of 210° C., then a polyethylene (B) that satisfies the following viscosity condition formulas (1) and (2):

$$\eta_6 \geq V_6 - 2000 \quad (1)$$

$$\eta_{30} \geq V_{30} - 2000 \quad (2)$$

is used as the resin for forming the metallic layer.

That is, when the inner layer is formed by using the polyethylene, the melt-extrusion temperature is roughly about 150 to about 230° C. and is close to the temperature of 210° C., Besides, the shear rate in the die head (specifically, the shear rate at the meeting region X) is in a range of about 6 to about 30 s$^{-1}$. It will, therefore, be understood that the above viscosity conditions are so determined that the viscosity of the resin that forms the layer neighboring the metallic layer on the inner side will not become very larger than the viscosity of the polyethylene (B) that is used for forming the metallic layer in the die head and, specifically, in the meeting region X in the extruder.

If, for example, the polyethylene (B) that fails to satisfy the above viscosity conditions is used for forming the metallic layer, the resin that neighbors thereto exhibits a large shear viscosity (i.e., becomes considerably harder than the polyethylene (B) for forming the metallic layer) in the meeting region X. As a result, the metallic layer resin stream 5 produces such a large stress that the metal pigment present in the resin stream 5 is partly deformed deteriorating, therefore, the metallic appearance and forming a shark skin that would be often observed as described above.

According to the present invention, however, the polyethylene (B) is so selected as to satisfy the above viscosity condition formulas (1) and (2), and the metallic layer is formed by blending the polyethylene (B) with the metal pigment. This effectively relaxes the stress produced in the metallic layer resin stream 5 in the meeting region X. As a result, the metal pigment is effectively prevented from being deformed and excellent metallic appearance is exhibited while suppressing the unevenness in the thickness of the metallic layer and the formation of shark skin.

With the decorative multilayered extrusion-blow-formed bottle of the present invention, a resin layer can also be provided on the outer side of the metallic layer (on the side of the outer layer). In this case, the resin layer is present not only on the inner side of the metallic layer but also on the outer side of the metallic layer neighboring thereto. Here, however, the metallic appearance is not affected by the shear viscosity of the resin that forms the resin layer on the outer side neighboring the metallic layer (layer neighboring the metallic layer on the outer side). This is because, as will also be understood from FIG. 1, the neighboring layer resin stream 7 on the outer side meets the streams under the meeting region X where the inner layer resin stream 1, reground layer resin stream 3 and metallic layer resin stream 5 are flowing in stable layers. Therefore, no large stress is caused to the metallic layer resin stream 5 by the neighboring layer resin stream 7 on the outer side.

In the layer structure shown in FIG. 1, further, the reground resin layer is provided between the inner layer and the metallic layer. Here, however, the resin for forming the reground resin layer may be the polyethylene (A) that is used for forming the inner layer. It is, further, allowable to form the metallic layer neighboring the inner layer. In this case, the inner layer neighbors the metallic layer on the inner side thereof. Therefore, the polyethylene (B) for forming the metallic layer must be so selected as to satisfy the above-mentioned viscosity condition formulas (1) and (2) for the polyethylene (A) (e.g., high-density polyethylene) that is used for forming the inner layer.

Figure 2:
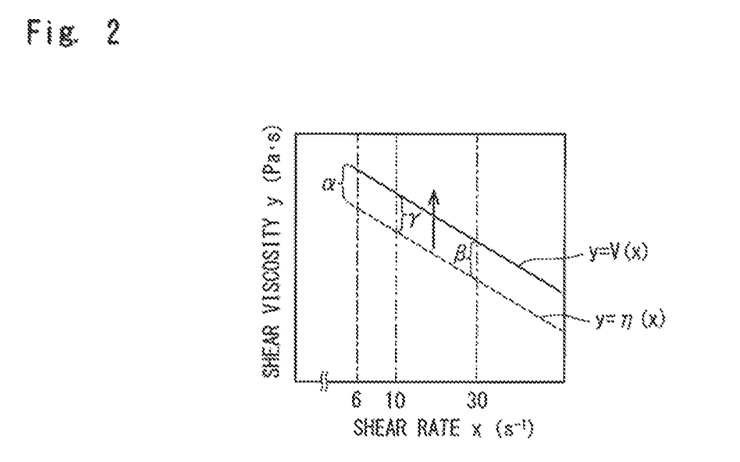
FIG. 2 is a diagram illustrating shear viscosity conditions to be satisfied by a polyethylene (B) used for forming a metallic layer in the present invention.
Figure 3A:
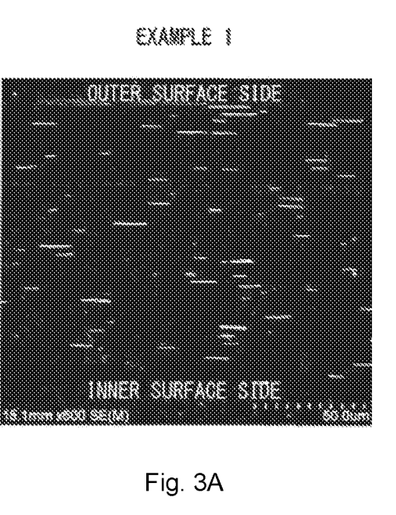
FIG. 3A is a photograph in cross section of a body wall of a bottle of Example 1 and FIG. 3B is a photograph in cross section of a bottle obtained in Comparative Example 1.
Figure 3B:
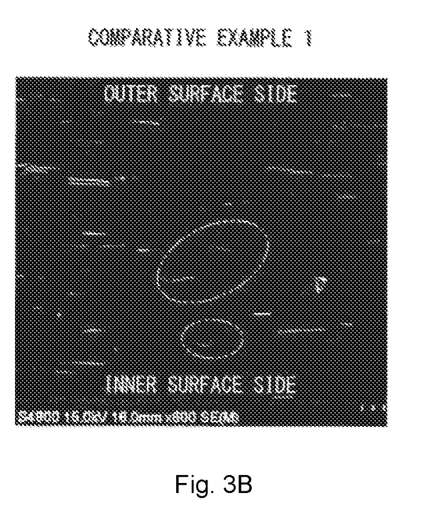

FIG. 2 shows a shear viscosity curve y=V(x) of a high-density polyethylene used for forming the inner layer in Example 1 appearing later. In the curve, the abscissa y represents a shear viscosity (Pa·s) and the ordinate x represents the shear rate (s$^{-1}$). From the shear viscosity curve, if the metallic layer is provided neighboring the inner layer, then y=η(x) in FIG. 2 represents a curve of the lower limit values of shear viscosity that should be satisfied by the polyethylene (B) for forming the metallic layer.

The viscosity condition formulas (1) and (2) are so set that the shear viscosities at shear rates 6 s$^{-1}$ and 30 s$^{-1}$ lie within predetermined ranges. In FIG. 2, α is a value (2000 Pa·s) that corresponds to ($V_6$-$\eta_6$) in the formula (1) and β is a value (2000 Pa·s) that corresponds to ($V_{30}$-$\eta_{30}$) in the formula (2).

In the present invention, further, it is desired that if the shear viscosity (Pa·s) of the resin that is forming the layer neighboring the metallic layer on the inner side thereof is denoted by $V_{10}$ as measured at a shear rate 10 s$^{-1}$ at a temperature of 210° C., then the shear viscosity (Pa·s) $\eta_{10}$ of the polyethylene (B) measured at the shear rate 10 s$^{-1}$ at the temperature of 210° C. satisfies the following viscosity condition formula (3):

$$\eta_{10} \geq V_{10} - 2000 \quad (3)$$

In FIG. 2, the shear viscosity curve is represented by a nearly straight line. Depending on the kind of the polyethylene (B) for forming the metallic layer, however, the curve could protrude upward or downward in the region of shear rates of 6 s$^{-1}$ to 30 s$^{-1}$. Therefore, even if the shear viscosity at the shear rate of 6 s$^{-1}$ or the shear viscosity at the shear rate of 30 s$^{-1}$ may satisfy the conditions of the formulas (1) and (2), the shear rate of the polyethylene (B) for forming the metallic layer could become very smaller than the shear rate of the resin forming the layer neighboring the metallic layer on the inner side in the region between the shear rate of 6 s$^{-1}$ and the shear rate of 30 s$^{-1}$. Here, however, if the polyethylene (B) for forming the metallic layer is so selected that the shear viscosity thereof becomes close to the shear viscosity of the resin forming the neighboring layer even at the shear rate of 10 s$^{-1}$ as represented by the viscosity conditions formula (3), then the shear viscosity of the polyethylene (B) for forming the metallic layer becomes close to the shear viscosity of the resin for forming the neighboring layer over the whole region of shear rates 6 s$^{-1}$ to 30 s$^{-1}$ (corresponds to the shear rates of resins in the die head). That is, the shear viscosities of the polyethylene (B) for forming the metallic layer and of the resin for forming the neighboring layer become close to each other in the meeting region X where the shear rates are not uniform, making it possible to reliably suppress deformation of the metal pigment caused by the difference in the shear viscosity in the meeting region X.

Here, in FIG. 2, γ is a value (2000 Pa·s) that corresponds to ($V_{10}$-$\eta_{10}$) in the formula (3).

In the present invention, there is no specific limitation on the upper values of the shear viscosities of the polyethylene (B) forming the metallic layer measured at shear rates of 6 to 30 s$^{-1}$ at the temperature of 210° C. so far as the conditions of the above-mentioned formulas (1) and (2) are satisfied or, further, so far as the conditions of the above-mentioned formula (3) are satisfied. Here, however, since the multilayered structure is formed by also melt-extruding the polyethylene (A) to form the inner layer, the shear viscosities of the polyethylene (B) do not become excessively larger than the shear viscosities of the resin used on the inner side. Usually, therefore, as measured at shear rates of 6 s$^{-1}$, 30 s$^{-1}$ and 10 s$^{-1}$, the shear viscosities of the polyethylene (B) are larger, by about 4000 Pa·s at the greatest, than those of the resin neighboring on the inner side.

<Metallic Layer>

The decorative multilayered extrusion-blow-formed bottle of the present invention is provided with the metallic layer for decoration on the outer side of the inner layer formed of the polyethylene (A). Here, the metallic layer is formed by using, as a base resin, the polyethylene (B) that satisfies the above-mentioned viscosity condition formulas (1) and (2) or (3), the polyethylene (B) being blended with the metal pigment that is dispersed therein.

As the metal pigment, there can be used those that develop metallic luster, such as aluminum pigment, copper pigment, copper-zinc (brass) pigment and copper-tin (bronze) pigment as well as bright pigments obtained by coating the surfaces of mica or the like with aluminum, iron oxide or titanium oxide. From the standpoint of metallic luster, in particular, it is desired to use the aluminum pigment and the aluminum-type bright pigment.

In the present invention, among the above-mentioned metal pigments, in particular, there is used a thin metal pigment having an average thickness of not more than 600 nm and, preferably, in a range of 100 to 500 nm. That is, when the metal pigment having such a small average thickness is used, the metal pigment can be quickly oriented in the direction in which the polyethylene (B) flows (in the direction of extrusion) at the time of melt extrusion making it possible to reduce the irregularly reflected light and to express excellent metallic tone. For example, if there is used a metal pigment having an average thickness larger than the above range, directivity of the reflected light becomes low, irregularly reflected light increases and hence the metallic appearance becomes insufficient. Further, if the thickness of the metal pigment is too small, the strength so decreases that the metal pigment tends to be easily deformed when it is melt-extruded.

The metal pigment should have an average grain size, usually, in a range of 1 to 50 μm and, specifically, 5 to 30 μm, and an aspect ratio (ratio of grain size and thickness: grain size (μm)/thickness (μm)) of not less than 10. The metal pigment of a flat shape having a large grain size compared to the thickness, when it is oriented, produces very high directivity in the reflected light, and is very advantageous in imparting the metallic appearance.

Desirably, further, the metal pigment is obtained by machining a metal powder into flakes of a flat shape by using a ball mill or the like. This is because the metal pigment thus obtained, usually, has a thickness of as large as 100 nm or more and is not easily deformed during the melt extrusion.

The above metal pigment is, usually, dispersed in a dispersant and, in this state, is mixed into the polyethylene (B) that is used as the base resin. As the dispersant, there is favorably used the one that helps improve the dispersion of the metal pigment in the base resin without spoiling the extrusion formability of the polyethylene (B). For example, there can be desirably used hydrocarbon type waxes such as polyethylene wax and polypropylene wax, as well as higher fatty acid wax.

The dispersant is, usually, used in an amount of about 10 to about 50 parts by mass per 100 parts by mass of the metal pigment.

In the present invention, the metal pigment is used in an amount of 0.1 to 30.0 parts by mass, specifically, 0.5 to 10.0 parts by mass and, more preferably, 1.0 to 5.0 parts by mass per 100 parts by mass of the polyethylene (B) from the standpoint of imparting favorable metallic appearance. If the amount of the metal pigment is too small, the metallic appearance cannot be expressed to a sufficient degree. If the metal pigment is used in an excess amount, on the other hand, the metal pigment is not sufficiently oriented and the metallic appearance becomes insufficient.

The polyethylene (B) used as the base resin for forming the metallic layer is, for example, of the extrusion grade that can be shaped into a bottle through the extrusion blow-forming (direct blow-forming) and, usually, has an MFR (melt-flow rate, 190° C.) in a range of about 0.1 to about 1.5 g/10 min. Here, however, it is necessary that the polyethylene (B) satisfies the above-mentioned viscosity condition formulas depending on the resin that is forming the layer neighboring the metallic layer on the inner side thereof. There is no specific limitation on the kind of the polyethylene (B) so far as it satisfies the viscosity condition formulas. Therefore, there can be used known polyethylenes such as a low-density polyethylene (LDPE) having a density of 0.910 g/cm$^3$ to 0.930 g/cm$^3$, a linear low-density polyethylene (LLDPE) having a density of 0.910 g/cm$^3$ to 0.925 g/cm$^3$ and a high-density polyethylene (HDPE) having a density of not less than 0.930 g/cm$^3$ alone or as a blend of two or more kinds thereof. For example, an acid-modified polyethylene that is used as an adhesive is not capable of satisfying the above-mentioned condition formulas and, therefore, cannot be used as the base resin for forming the metallic layer.

When two or more kinds of polyethylenes are used being blended together, it is necessary that the shear viscosities of the blend satisfy the above-mentioned viscosity condition formulas (1) and (2) or, further, the formula (3).

In the present invention, it is desired to use an LDPE having an MFR of 0.1 to 1.5 g/10 min. from the standpoint of improving the orientation of the metal pigment in the direction of extrusion. In this case, the highest degree of metallic appearance can be expressed compounded by the effect of preventing the deformation as a result of satisfying the above-mentioned viscosity condition formulas.

In the present invention, the polyethylene (B) used as the base resin of the metallic layer may be blended with other components so far as they do not impair the orientation of the metal pigment. For instance, the polyethylene (B) is often blended with a dispersing agent for homogeneously dispersing the metal pigment as described earlier.

The thickness of the metallic layer is, usually, set to be not less than 10 μm, and is specifically set to lie in a range of 50 to 500 μm. In the invention, in particular, the stress is effectively relaxed in the meeting region X at the time of extrusion forming and, therefore, the thickness of the metallic layer, too, is effectively prevented from fluctuating. Namely, the metallic layer is formed maintaining a uniform thickness, and the bottle as a whole expresses the metallic appearance without shading.

<Inner Layer>

The decorative multilayered extrusion-blow-formed bottle of the present invention has the inner layer formed by using the polyethylene (A). As for the polyethylene (A), there is imposed no specific limitation, and there can be used any polyethylene of the extrusion grade that can be shaped into a bottle having an MFR (melt-flow rate, 190° C.) of, for example, about 0.2 to about 1.0 g/10 min. There is no specific limitation on the kind thereof, either, and there can be used a known polyethylene such as a low-density polyethylene (LDPE), a linear low-density polyethylene (LLDPE) or a high-density polyethylene (HDPE), or a blend thereof like in the case of the polyethylene (B) for forming the metallic layer. From the standpoint of imparting a predetermined strength to the bottle, however, it is particularly desired to use the high-density polyethylene (HDPE) having a density of not less than 0.930 g/cm³. The inner layer has a thickness of, usually, about 50 to about 200 μm.

<Other Layers>

The decorative multilayered extrusion-blow-formed bottle of the present invention can acquire a multilayered structure provided with other layers under the condition that it has the inner layer of the above-mentioned polyethylene resin (A) and, on the outer side of the inner layer, the metallic layer formed by using, as the base resin, the polyethylene (B) that satisfies the predetermined viscosity condition formulas.

As shown, for example, in FIG. 1, a reground resin layer can be provided between the inner layer and the metallic layer. As described earlier, the reground resin layer is a layer of a mixed resin of a polyethylene and scraps such as burr generated at the time of forming the bottles. The polyethylene used here is the same as the polyethylene that forms the inner layer or the metallic layer. Here, when mixed with the scraps (inclusive of resin components), the polyethylene should exhibit predetermined shear viscosities. The polyethylene (B) that forms the metallic layer, on the other hand, has been so selected as to satisfy the viscosity condition formulas (1) and (2) and, further, the formula (3).

In addition to forming the above-mentioned layers, it is further allowable to form a gas-barrier resin layer, an oxygen-absorbing resin layer and an adhesive layer between the inner layer and the metallic layer, or on the outer side of the metallic layer so far as they do not impair the metallic appearance of the metallic layer or do not impair the extrusion-blow formability.

The gas-barrier resin layer is a layer formed by using a gas-barrier resin having an oxygen permeation coefficient at 37° C.-0% RH of not more than $5.5 \times 10^{-12}$ cc·cm/cm²·sec·cmHg, such as ethylene/vinyl alcohol copolymer or polyamide and, specifically, ethylene/vinyl alcohol copolymer.

As the ethylene/vinyl alcohol copolymer (saponified product of ethylene/vinyl acetate copolymer), concretely speaking, there can be preferably used a saponified product of a copolymer obtained by saponifying an ethylene/vinyl acetate copolymer having an ethylene content of 20 to 60 mol % and, specifically, 25 to 50 mol % such that the degree of saponification is not less than 96 mol % and, specifically, not less than 99 mol %. The ethylene/vinyl alcohol copolymer (hereinafter often called EVOH) should have a molecular weight large enough for forming a bottle and, usually, has an intrinsic viscosity which is not less than 0.01 dl/g and, specifically, not less than 0.05 dl/g as measured in a mixed solvent of phenol and water at a weight ratio of 85 to 15 at 30° C.

In the above gas-barrier resin layer, the oxygen-barrier resin may be blended with any other thermoplastic resin so far as its excellent oxygen barrier property is not impaired.

The oxygen-absorbing resin layer works to reinforce the oxygen barrier property and, as described in JP-A-2002-240813 and others, is a layer that contains an oxidizable polymer and a transition metal type catalyst. Being assisted by the action of the transition metal type catalyst, the oxidizable polymer is oxidized with oxygen, i.e., absorbs oxygen and hence shuts off the permeation of oxygen. The oxidizable polymer and the transition metal type catalyst have been closely described in the above JP-A-2002-240813 and others, and, therefore, are not described here in detail. Representative examples of the oxidizable polymer include oleftin type resins having tertiary carbon atoms (e.g., polypropylene, polybutene-1, and copolymers thereof), thermoplastic polyester and aliphatic polyamide; xylylene group-containing polyamide resins; and ethylenically unsaturated group-containing polymers (e.g., polymers derived from polyenes such as butadiene and the like). Further, representative examples of the transition metal type catalyst include inorganic salts of transition metals such as iron, cobalt and nickel, inorganic acid salts and complexes thereof.

The adhesive layer is a layer that is provided when the layers neighboring each other have poor adhesiveness, and is formed by using an adhesive resin that is known per se., such as ethylene-α-olefin copolymer resin or an acid-modified resin thereof, a copolymerized resin of an olefin and an acid, or a glycidyl group-containing resin. It is also allowable to add a known tackifier to the adhesive resins to improve their adhesiveness.

As the copolymer resin, there can be used those produced by any copolymerizing method such as random, block or graft copolymerization. As the acid-modified resin, for example, there can be used a resin that is graft-modified with an unsaturated carboxylic acid such as acrylic acid, methacrylic acid, maleic acid, fumaric acid, itaconic acid or crotonic acid, or with an anhydride thereof. These resins can be used in a single kind, as a blend of two or more kinds or as a blend with other resins. As the tackifier, there can be exemplified rosin type resin, terpene type resin and petroleum resin. These resins can be used in a single kind or as a mixture of two or more kinds.

In the invention, further, the above-mentioned metallic layer can be provided as the outermost layer. So far as the metallic appearance of the metallic layer is not impaired, however, it is also allowable to provide, on the outer side of the metallic layer, a transparent resin layer or a decorative layer formed by blending a transparent resin with other pigments than the metal pigment added to the metallic layer. It is allowable to, further, provide a transparent resin layer as the outermost layer on the decorative layer.

As the other pigments to be used for the decorative layer, there can be used, for example, the metal pigments having average thicknesses of not less than 1 μm out of those metal pigments exemplified above for use in the metallic layer in addition to a variety of inorganic or organic pigments, as well as pearl-like pigments obtained by coating natural mica with titanium oxide or iron oxide.

Further, as the transparent resin used for forming the decorative layer or as the transparent resin used for forming the transparent resin layer, there can be used an olefin type resin or a polyester resin of the extrusion-forming grade having transparency of such a degree that will not impair the legibility from the outer side of the underlying metallic layer or the decorative layer.

As the olefin type resin, there can be exemplified polyethylenes such as low-density polyethylene (LDPE), medium-density polyethylene (MDPE), high-density polyethylene (HDPE), linear low-density polyethylene (LLDPE), linear very-low-density polyethylene (LVLDPE), as well as polypropylene, ethylene/propylene copolymer, polybutene-1, ethylene/butene-1 copolymer, propylene/butane-1 copolymer, ethylene/propylene/butane-1 copolymer, ethylene/vinyl acetate copolymer and ionically crosslinked olefin copolymer (ionomer). Further, an amorphous or lowly crystalline copolymer (COC) of a noncyclic olefin and a cyclic olefin, too, can be used as the transparent resin.

As the polyester resin, there can be exemplified polyethylene terephthalate (PET), polybutylene terephthalate (PBT), polyethylene naphthalate (PEN) and amorphous polyester resin in which copolyester units have been introduced in small amounts into the ethylene terephthalate unit.

As the copolymerizable component for forming the above copolyester, there can be exemplified dicarboxylic acid components such as isophthalic acid, p-β-oxyethoxybenzoic acid, naphthalene-2,6-dicarboxylic acid, diphenoxyethane-4,4'-dicarboxylic acid, 5-sodiumsulfoisophthalic acid, adipic acid, sebacic acid, and alkyl ester derivatives of these dicarboxylic acids; and glycol components such as propylene glycol, 1,4-butanediol, neopentyl glycol, 1,6-hexylene glycol, cyclohexanedimethanol, ethylene oxide adduct of bisphenol A, diethylene glycol and triethylene glycol.

In the present invention, it is particularly desired to use the olefin type resin and the amorphous polyester resin as the transparent resin from the standpoint of scratch resistance, flexibility and luster.

In the present invention, the above-mentioned layers may be each blended with a various kinds of blending agents that have been known per se., such as lubricant, various reforming agents and ultraviolet ray absorber within ranges in which they do not impair the metallic appearance expressed by the metallic layer.

In the multilayered structure provided with various layers as described above, it needs not be pointed out that a relationship that satisfies the above-mentioned condition formulas (1) and (2) or, further, the condition formula (3) is maintained between the polyethylene (B) used for forming the metallic layer and the resin that forms the layer that neighbors the metallic layer on the inner side thereof.

Moreover, the above-mentioned various layers have thicknesses that are so set as to exhibit their functions to meet their requirements depending upon the thickness of the bottle that is finally formed, capability of being squeezed and flexibility.

<Layer Structures>

The decorative multilayered extrusion-blow-formed bottle of the present invention can assume various layer structures provided it has a specific inner layer and a metallic layer as described above. Most generally, however, the following layer constitution is employed.

Inner Layer:
 HDPE
 Thickness: 50 to 200 Um
Resin Layer Neighboring on the Inner Side:
 HDPE or reground resin (mixed resin of HDPE and burr generated at the time of forming the bottles)
 Thickness: 500 to 1000 μm
Metallic Layer:
 Metal pigment (specifically, flake-like aluminum pigment)
 LDPE
 Thickness: not less than 10 μm, specifically, 50 to 500 μm
Adhesive Layer:
 Adhesive resin
 Thickness: 20 to 200 μm
Outer Layer (Transparent Resin Layer):
 Amorphous polyester resin
 Thickness: 10 to 200 μm, specifically, 25 to 100 μm <Production of the Decorative Multilayered Extrusion-Blow-Formed Bottle>

To produce the above-mentioned decorative multilayered extrusion-blow-formed bottle of the present invention, a pipe-like preform (parison) having a predetermined multilayered structure is formed by the extrusion forming. The preform is then pinched off at its one end and, in this state, a blowing fluid such as the air is blown therein so that it is shaped into a bottle. With the thus formed bottle, the metal pigment in the metallic layer has been effectively suppressed from being deformed. Therefore, excellent metallic appearance is expressed.

For example, when the light is caused to be incident on the outer surface of the bottle wall at an angle of 45 degrees by using a multi-angle colorimeter, a lightness $L^*_{15}$ due to the light reflected in a direction of 15 degrees relative to the regularly reflected light is as very high as not less than 150.

Further, accompanying such a high lightness $L^*_{15}$, a flip-flop (FF) value represented by the following formula, too, becomes as high as 15 or more.

$$FF=(L^*_{15}-L^*_{110})/L^*_{45}$$

wherein,
 $L^*_{15}$ is a lightness due to the light reflected in a direction of 15 degrees relative to the regularly reflected light of when the light is caused to be incident on the outer surface of the bottle wall at an angle of 45 degrees,
 $L^*_{110}$ is a lightness due to the light reflected in a direction of 110 degrees relative to the regularly reflected light, and
 $L^*_{45}$ is a lightness due to the light reflected in a direction of 45 degrees relative to the regularly reflected light (reflected in a direction of 90 degrees relative to the surface of reflection).

That is, the lightness $L^*_{15}$ and the FF value that are high stand for that a very excellent metallic appearance is being expressed.

The L* values representing the lightness of the reflected light beams are all the L* values in the L*a*b* coloring systems.

In the decorative multilayered extrusion-blow-formed bottle of the present invention, the metallic layer for exhibiting a decoration in a metallic tone is formed simultaneously with the formation of the bottle, and there is required no coating after the formation or no treatment with a decorative shrink film. Besides, the metallic film can be formed by using an existing extrusion-forming machine and, therefore, effectively alleviates an increase in the cost of metallic decoration. Moreover, no limitation is imposed on the shape of the bottle (specifically, on the shape of the body portion) that otherwise is caused such as when a shrink film is used for imparting metallic decoration.

Therefore, the bottle can be used for containing expensive products such as cosmetics, as a matter of course, as well as for containing inexpensive products such as shampoo, rinse, liquid detergents, softening agent and the like products contributing to enhancing commercial appeal based on metallic decorative appearance.

EXAMPLES

Excellent effects of the decorative multilayered extrusion-blow-formed bottle of the invention will now be described by the following Experimental Examples to which only, however, the invention is in no way limited.

In the following Experimental Examples, various measurements and evaluations were taken by the methods described below.

Examples 1 to 4, Comparative Examples 1 and 2

A 500-ml multilayered bottle (50 g) was formed by using a directly blow-forming machine and an extruder described below.
Forming machine: Shuttle type forming machine manufactured by Tahara Co.
Extruder: first layer, φ30-FF L/D=22
  second layer, φ30-FF L/D=22
  third layer, φ30-FF/DF L/D=22
  fourth layer, φ55-FF L/D=28
  fifth layer, φ40-FF L/D=28
Described below are the layer constitution of the bottle and materials.
Layer constitution: five-kind-five-layer
  (Inner side) Inner layer/layer neighboring on the inner side/metallic layer (base resin+metal pigment)/adhesive layer/outer layer (transparent resin layer) (outer side)
  (Inner side) 15/63/10/7/5 (unit: wt %) (outer side)
Materials:
  Inner layer: HDPE, HI-ZEX 6700B (polyethylene (A)) produced by Prime Polymer Co., Ltd.
  Layer neighboring on the inner side: HDPE, HI-ZEX 6700B produced by Prime Polymer Co., Ltd.
  Base resin forming the metallic layer:
    LDPE-A: LDPE, Sumikasen F101 produced by Sumitomo Chemical Co., Ltd. (density: 0.922 g/cm$^3$, MFR: 0.3 g/10 min.)
    LDPE-B: LDPE, Novatec LB420M produced by Japan Polyethylene Co. (density: 0.922 g/cm$^3$, MFR: 0.7 g/10 min.)
    LDPE-C: LDPE, Novatec LF448K1 produced by Japan Polyethylene Co. (density: 0.925 g/cm$^3$, MFR: 2.0 g/10 min.)
  Metal pigments in the metallic layer:
    Aluminum pigment A: average thickness, 300 nm
    Aluminum pigment B: average thickness, 200 nm
    Aluminum pigment C: average thickness, 400 nm
    Aluminum pigment D: average thickness, 700 nm
    (The aluminum pigments were used in the form of pellets that contained polyethylene wax as a dispersant)
  Adhesive resin: Modic F573 produced by Mitsubishi Chemical Co.
  Outer layer (transparent resin layer): PETG, Easter GN001 produced by Eastman Co.

Example 5

A decorative multilayered extrusion-formed bottle was obtained in the same manner as in Example 1 but forming the layer neighboring the metallic layer on the inner side as the inner layer and forming the layers in a four-kind-four-layer constitution.

Examples 6 and 7

Decorative multilayered extrusion-formed bottles were obtained in the same manner as in Example 1 but cutting the decorative multilayered extrusion-formed bottles obtained in Examples 1 and 4 to obtain scraps thereof, and mixing the scraps with the polyethylene used for the inner layer at a ratio of 1 to 4 to form a reground resin layer as the layer that neighbors on the inner side.

Table 1 shows the kinds of the base resins in the metallic layers and kinds of the aluminum pigments used in Examples and Comparative Examples.

Table 1 shows the measured results of shear viscosities $V_6$, $V_{10}$ and $V_{30}$ of the resin forming the layer that neighbors on the inner side at the shear rates 6 s$^{-1}$, 10 s$^{-1}$ and 30 s$^{-1}$ and the shear viscosities $\eta_6$, $\eta_{10}$ and $\eta_{30}$ of the resin (polyethylene (B)) forming the metallic layer at the shear rates 6 s$^{-1}$, 10 s$^{-1}$ and 30 s$^{-1}$.

The prepared multilayered bottles were evaluated for their lightness $L^*_{15}$, flip-flop (FF) values and metallic appearance. The results were as shown in Table 1.

Described below are the methods of evaluation.
(Measuring the Shear Viscosities)

By using the CAPILOGRAPH manufactured by Toyo Seiki Seisaku-sho Ltd. measurements were taken in compliance with the JIS K7199:1999. The measuring conditions consisted of using a capillary die of a capillary length of 10 mm and a capillary diameter of 1.0 mm at a testing temperature of 210 for a preheating time of 5 min., residence time of 15 min. and gradually decreasing the shear rate.

(Average Thicknesses of the Aluminum Pigments)

An average thickness of the aluminum pigments is represented by an average value by measuring 50 aluminum pigment particles selected in a random fashion by using a scanning electron microscope.

($L^*_{15}$, FF Value)

The central portion of the body of the prepared multilayered bottle was cut open at four places maintaining a gap of 90° to obtain test pieces. By using a multi-angle spectral colorimeter MA94JP manufactured by X-Rite Co., the light over a wavelength range of 400 to 700 nm was caused to fall on a flat test surface of the test piece at an angle of incidence of 45° with respect to the direction perpendicular to the test surface that is regarded to be a 0° reference. Lightnesses (L* values in the L*a*b* coloring system) of the light reflected in the directions of 15°, 45° and 110° which are the offset angles of the incident light from the direction of regular reflection were, respectively, measured as $L^*_{15}$, $L^*_{45}$ and $L^*_{110}$.

By using the thus measured L* values ($L^*_{15}$, $L^*_{45}$, $L^*_{110}$), a degree of change in the L* value between the offset angles 15° and 110° was calculated as an FF value as follows:

$$FF \text{ value} = 2.69 \cdot (L^*_{15} - L^*_{110})^{1.11} / L^{*0.86}_{45}$$

(Overall Evaluation)

Table 1 below shows the results of overall evaluation inclusive of metallic appearance and defective appearance (die lines, unmolten resin) with the eye. The evaluation is based on Comparative Example 1 which is regarded to be a reference, and +++ represents very excellent, ++ represents excellent, and + represents good. A symbol ±means the result is equivalent to the reference.

TABLE 1

| | Metallic layer | | Layer neighboring on the inner side | | | Metallic layer | | | Evaluation | | |
|---|---|---|---|---|---|---|---|---|---|---|---|
| | Base resin | Metal pigment | $V_6$ | $V_{10}$ | $V_{30}$ | $\eta_6$ | $\eta_{10}$ | $\eta_{30}$ | $L^*_{15}$ | FF value | Overall evaluation |
| Ex. 1 | LDPE-A | aluminum pigment A | 6196 | 4555 | 2593 | 6923 | 4921 | 2938 | 195 | 28 | +++ |
| Ex. 2 | LDPE-A | aluminum pigment B | 6196 | 4555 | 2593 | 6923 | 4921 | 2938 | 185 | 24 | +++ |
| Ex. 3 | LDPE-A | aluminum pigment C | 6196 | 4555 | 2593 | 6923 | 4921 | 2938 | 200 | 24 | +++ |
| Ex. 4 | LDPE-B | aluminum pigment A | 6196 | 4555 | 2593 | 4674 | 3268 | 2025 | 185 | 23 | ++ |
| Ex. 5 | LDPE-A | aluminum pigment A | 6196 | 4555 | 2593 | 6923 | 4921 | 2938 | 195 | 25 | ++ |
| Ex. 6 | LDPE-A | aluminum pigment A | 5576 | 4100 | 2334 | 6923 | 4921 | 2938 | 195 | 25 | ++ |
| Ex. 7 | LDPE-B | aluminum pigment A | 5576 | 4100 | 2334 | 4974 | 3268 | 2025 | 185 | 23 | ++ |
| Comp. Ex. 1 | LDPE-A | aluminum pigment D | 6196 | 4555 | 2593 | 6923 | 4921 | 2938 | 175 | 20 | ± |
| Comp. Ex. 2 | LDPE-C | aluminum pigment A | 6196 | 4555 | 2593 | 3012 | 2274 | 1384 | 170 | 20 | ± |

DESCRIPTION OF REFERENCE NUMERALS

1: inner layer resin stream
3: reground layer resin stream
5: metallic layer resin stream
7: stream of layer resin neighboring on the outer side
10: multilayer die

The invention claimed is:

1. A decorative multilayered extrusion-blow-formed bottle having an inner layer of a polyethylene (A) and a metallic layer of a polyethylene (B) in which a metal pigment having an average thickness of not more than 600 nm is dispersed on an outer side of said inner layer,
wherein, if a shear viscosities (Pa·s) of a resin that is forming a layer neighboring said metallic layer on an inner side thereof are denoted by $V_6$ and $V_{30}$ as measured at a shear rates 6 s$^{-1}$ and 30 s$^{-1}$ thereof at a temperature of 210° C., then a shear viscosities (Pa·s) $\eta_6$ and $\eta_{30}$ of the polyethylene (B) measured at the shear rates 6 s$^{-1}$ and 30 s$^{-1}$ thereof at a temperature of 210° C. satisfy the following viscosity condition formulas (1) and (2):

$$\eta_6 \geq V_6 - 2000 \quad (1)$$

$$\eta_{30} \geq V_{30} - 2000 \quad (2);$$

(a) the polyethylene (B) forming the metallic layer has an MFR (190° C.) in a range of 0.3 to 0.7 g/10 min;
(b) the metal pigment has a thickness of not less than 100 nm;
(c) the metal pigment is dispersed in the metallic layer in an amount of 1.0 to 5.0 parts by mass per 100 parts by mass of the polyethylene (B); and
(d) wherein, if a shear viscosity (Pa·s) of a resin that is forming a layer neighboring said metallic layer on an inner side thereof is denoted by $V_{10}$ as measured at a shear rate 10 s$^{-1}$ thereof at a temperature of 210° C., then a shear viscosity (Pa·s) $\eta_{10}$ of said polyethylene (B) measured at the shear rate 10 s$^{-1}$ thereof at the temperature of 210° C., further, satisfies the following viscosity condition formula (3):

$$\eta_{10} \geq V_{10} - 2000 \quad (3).$$

2. The decorative multilayered extrusion-blow-formed bottle according to claim 1, wherein the layer neighboring said metallic layer on the inner side thereof is said inner layer.

3. The decorative multilayered extrusion-blow-formed bottle according to claim 1, wherein the resin that is forming the layer neighboring said metallic layer on the inner side thereof is the polyethylene (A).

4. The decorative multilayered extrusion-blow-formed bottle according to claim 1, wherein the layer neighboring said metallic layer on the inner side thereof is a reground resin layer containing scraps that generate during the forming.

5. The decorative multilayered extrusion-blow-formed bottle according to claim 1, wherein said metal pigment is an aluminum pigment.

* * * * *